(12) United States Patent
Batten, Jr.

(10) Patent No.: US 10,471,363 B2
(45) Date of Patent: Nov. 12, 2019

(54) SELF-PIVOTING DRIVE WITH INTERNAL GEARS FOR SPHERICAL-FORM MOTION SIMULATORS

(71) Applicant: George W. Batten, Jr., Houston, TX (US)

(72) Inventor: George W. Batten, Jr., Houston, TX (US)

( * ) Notice: Subject to any disclaimer, the term of this patent is extended or adjusted under 35 U.S.C. 154(b) by 151 days.

(21) Appl. No.: 15/859,655

(22) Filed: Dec. 31, 2017

(65) Prior Publication Data

US 2019/0201795 A1 Jul. 4, 2019

(51) Int. Cl.

| | |
|---|---|
| *A63G 31/16* | (2006.01) |
| *F16H 19/00* | (2006.01) |
| *A63G 31/02* | (2006.01) |
| *A63F 13/285* | (2014.01) |
| *A63G 31/14* | (2006.01) |
| *F16H 1/20* | (2006.01) |
| *F16H 1/12* | (2006.01) |
| *F16H 1/16* | (2006.01) |
| *F16H 1/18* | (2006.01) |
| *F16H 55/17* | (2006.01) |
| *F16H 55/22* | (2006.01) |
| *F16H 29/06* | (2006.01) |

(52) U.S. Cl.
CPC ............ *A63G 31/16* (2013.01); *A63F 13/285* (2014.09); *A63G 31/02* (2013.01); *A63G 31/14* (2013.01); *F16H 1/12* (2013.01); *F16H 1/16* (2013.01); *F16H 1/18* (2013.01); *F16H 1/203* (2013.01); *F16H 19/001* (2013.01); *F16H 29/06* (2013.01); *F16H 55/17* (2013.01); *F16H 55/22* (2013.01)

(58) Field of Classification Search
CPC ........ A63G 31/02; A63G 31/14; A63G 31/16; A63F 13/285; F16H 1/00; F16H 1/003; F16H 1/006; F16H 1/02; F16H 1/04; F16H 1/06; F16H 1/08; F16H 1/12; F16H 1/16; F16H 1/18; F16H 1/20; F16H 1/203; F16H 1/206; F16H 19/001; F16H 2048/364; F16H 29/06; F16H 55/00; F16H 55/02; F16H 55/17; F16H 55/22
See application file for complete search history.

(56) References Cited

U.S. PATENT DOCUMENTS 6,098,480 A * 8/2000 Fleytman .................. F16H 1/16
74/424
2015/0300418 A1* 10/2015 Averill ..................... F16D 11/14
477/13

(Continued)

*Primary Examiner* — Prasad V Gokhale

(57) ABSTRACT

This mechanism for driving motions of a surface of spherical, ellipsoidal, plane, or other shape comprises a pair of drive wheels mounted on a freely pivoting frame, each wheel being driven by its own bidirectional motor. The motors and the active electronics of an angle encoder are mounted in an associated fixed frame, so no slip rings or other rotating connections are needed for motor power and control, or for determining the rotation angle of the pivoting frame. Control of the motors provides differential rotation of the two wheels to effect controlled rotation of the pivoting frame, and therefore of wheel direction. This avoids the use of a separate motor for changing the direction of motion of the surface. All parts of the mechanism driving wheel rotation are enclosed by the pivoting frame or the fixed frame.

6 Claims, 3 Drawing Sheets

(56) References Cited

U.S. PATENT DOCUMENTS

2017/0234406 A1* 8/2017 Batten, Jr. .............. F16H 1/203
                                                    74/421 A
2019/0128396 A1* 5/2019 Chu ....................... B62D 11/10

* cited by examiner

SELF-PIVOTING DRIVE WITH INTERNAL GEARS FOR SPHERICAL-FORM MOTION SIMULATORS

REFERENCES CITED

U.S. PATENT DOCUMENTS

| | | | | |
|---|---|---|---|---|
| 5,490,784 | February 1996 | Carmein | Virtual reality system with enhanced sensory apparatus | 434/29 |
| 6,629,896 | October 2003 | Jones | Nimble virtual reality capsule using rotatable drive assembly | 472/60 |
| 9,829,070 | November 2017 | Batten | Self-pivoting drive for spherical-form motion simulaors | F16H 1/203 |

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

STATEMENT REGARDING PRIOR DISCLOSURE BY THE INVENTOR

There have been no prior disclosures by the inventor.

BACKGROUND OF THE INVENTION

Field of the Invention

This invention relates generally to mechanisms for driving motion simulators such as those of virtual reality systems, flight simulators, and interactive game seats. It is a simple mechanism for rotating a simulator with an exterior shell which is part or all of a sphere. It preferably would be used with a second such mechanism to drive a spherical surface in any variable rotation.

The Prior Art

U.S. Pat. Nos. 5,490,784 and 6,629,896 show motion simulators which have spherical exterior shells and a support arrangement that includes rotatable drive wheels. In both of these, rotation of the sphere is driven by the drive wheels in frictional contact with the spherical surface. The drive wheel is mounted so the axis of wheel rotation, can be rotated about the line perpendicular to the sphere's surface at the point at which the wheel contacts the surface. Both patents use one motor for rotation of the drive wheel, and another motor for rotation of the wheel's axis. U.S. Pat. No. 5,490,784 shows an arrangement with differentially-coupled double wheels driven by a single motor, plus a second motor for rotation of the wheel axis; the rotations of the wheels are not independent.

U.S. Pat. No. 9,829,070 shows a drive mechanism for which rotation is coupled to the drive wheels using a ring gear mounted on each of the wheels. The driving spur gear and the ring gear for each wheel are mounted exterior to the rotating frame which supports the wheels. This has the following disadvantages: (1) each spur gear-ring gear pair, hence the associated drive wheel, must be mounted close to the rotating frame, and this restricts the accuracy with which rotation of the drive wheels determines the position of the rotating frame; (2) it is difficult to provide continuous lubrication of gears exterior to the rotating frame; and (3) gears outside the rotating frame are exposed to dirt. The present invention provides a similar arrangement, but one in which all gears are inside the rotating frame.

BRIEF SUMMARY OF THE INVENTION

In contrast to prior art except U.S. Pat. No. 9,829,070, the present invention has a common-axis double-wheel arrangement with each wheel driven by a separate motor. The wheels are mounted on a pivoting frame which freely rotates about a line perpendicular to the axis of the wheels. In application, the two wheels are in frictional contact with the driven surface, so controlled differential rotation of the wheels is used to set the direction of the axis of the wheels. The surface can be part or all of a sphere, but the invention can be applied to other surfaces, including, but not limited to cylinders, ellipsoids, and planes. In the following, the term "sphere" will be used to mean any such surface.

The sphere rotates when the two wheels of the invention turn in the same direction. The arrangement is symmetrical, and the two motors work together to drive the rotation of the sphere. Thus, two small motors rather than one larger motor can be used for sphere rotation; an additional motor for moving of the wheel axis is not necessary.

The invention includes an angle encoder measuring the direction of wheel action. The active electronics of the angle encoder are mounted on the rigidly-mounted frame.

The connections between the rigidly-mounted frame and the pivoting frame that supports the wheels are all mechanical. Thus, all electrical connections to the motors and angle encoder arise in a rigidly-mounted frame, so no slip-rings or other rotating connections are needed. This is an important, unique feature of the invention.

In contrast to U.S. Pat. No. 9,829,070, gears rotating the drive wheels are enclosed by the rotating frame.

Both the foregoing summary and the detailed description which follows are exemplary and explanatory only, and they are not to be considered restrictive of the invention as claimed. The figures are schematic, and are not to be considered complete plans or drawings suitable for production of the invention.

DETAILED DESCRIPTION OF THE INVENTION

Figure 1:
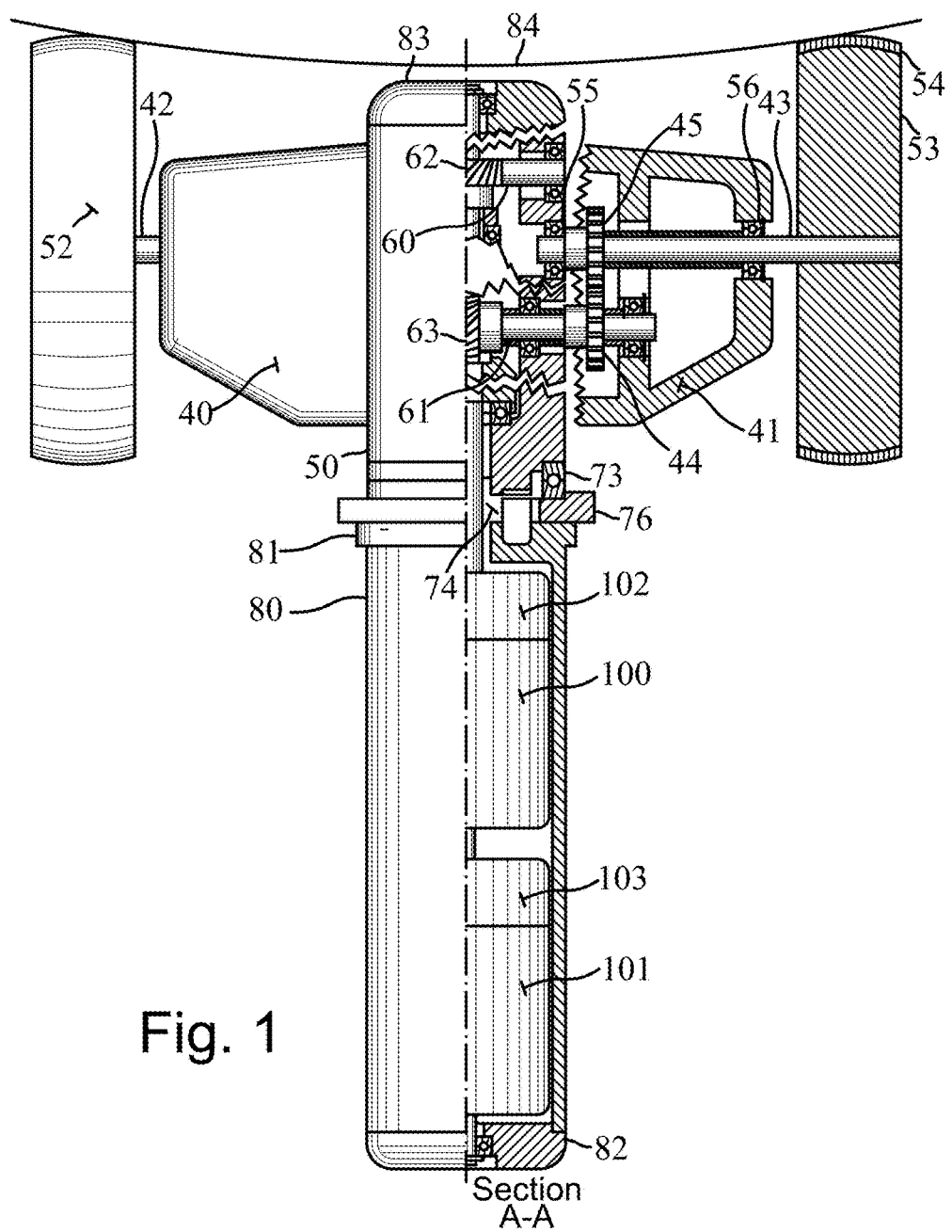
FIG. 1 shows one embodiment of the invention. The view is a half-sectional view showing the exterior appearance of the invention, and the gear arrangement viewed in one direction. The cross-sectional part is broken in three places to simplify display of gear and wheel positions. The broken-out parts are rotated to correspond with the angled part of section line A-A in FIG. 2.
Figure 2:
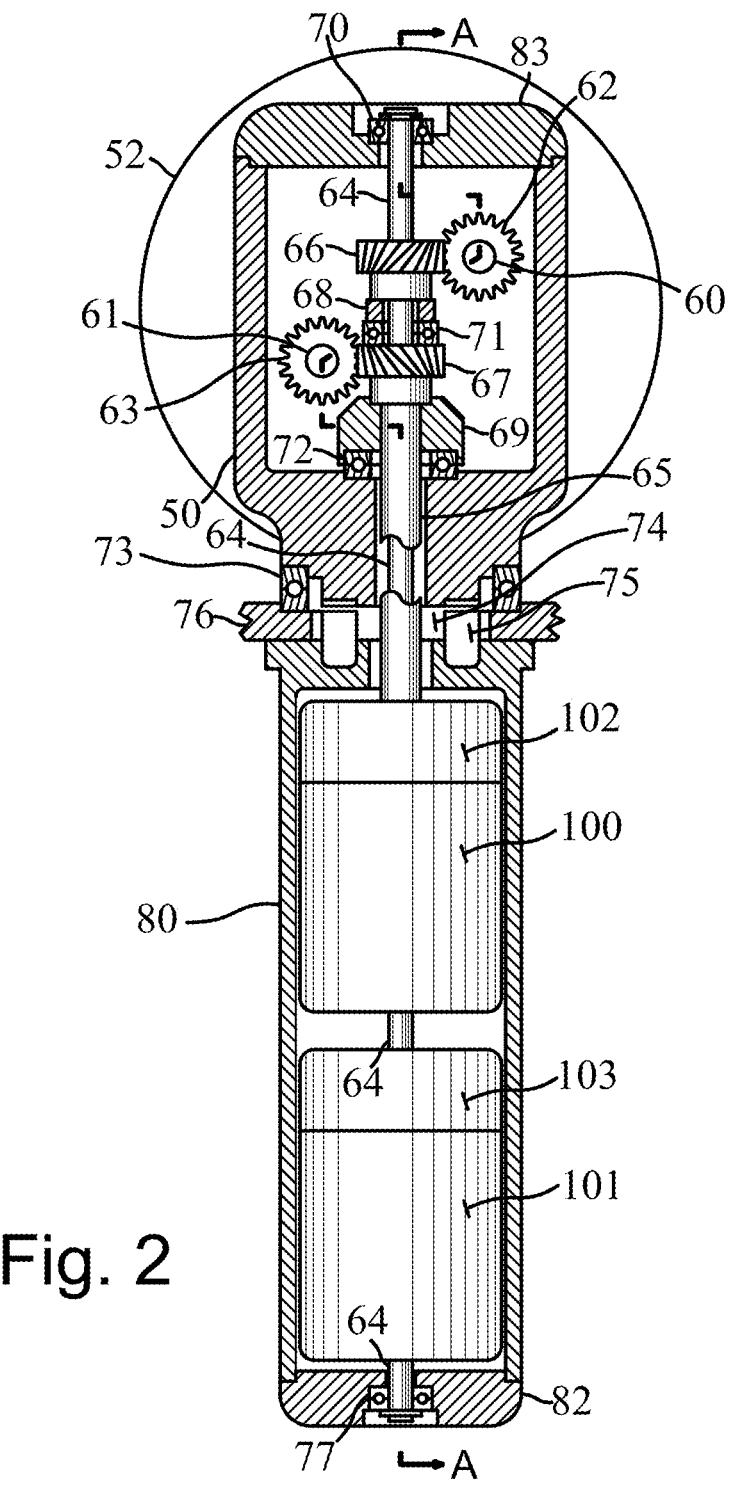
FIG. 2 is a cross-section view at the centerline and from the right side as shown in FIG. 1.

FIG. 1 and FIG. 2 show two views of the invention, each of the views showing parts of the mechanism. The view in FIG. 2 is a cross-sectional view at the plane midway between the wheels. The view in FIG. 1 is a half-sectional view taken along section line A-A shown in FIG. 2.

Figure 3:
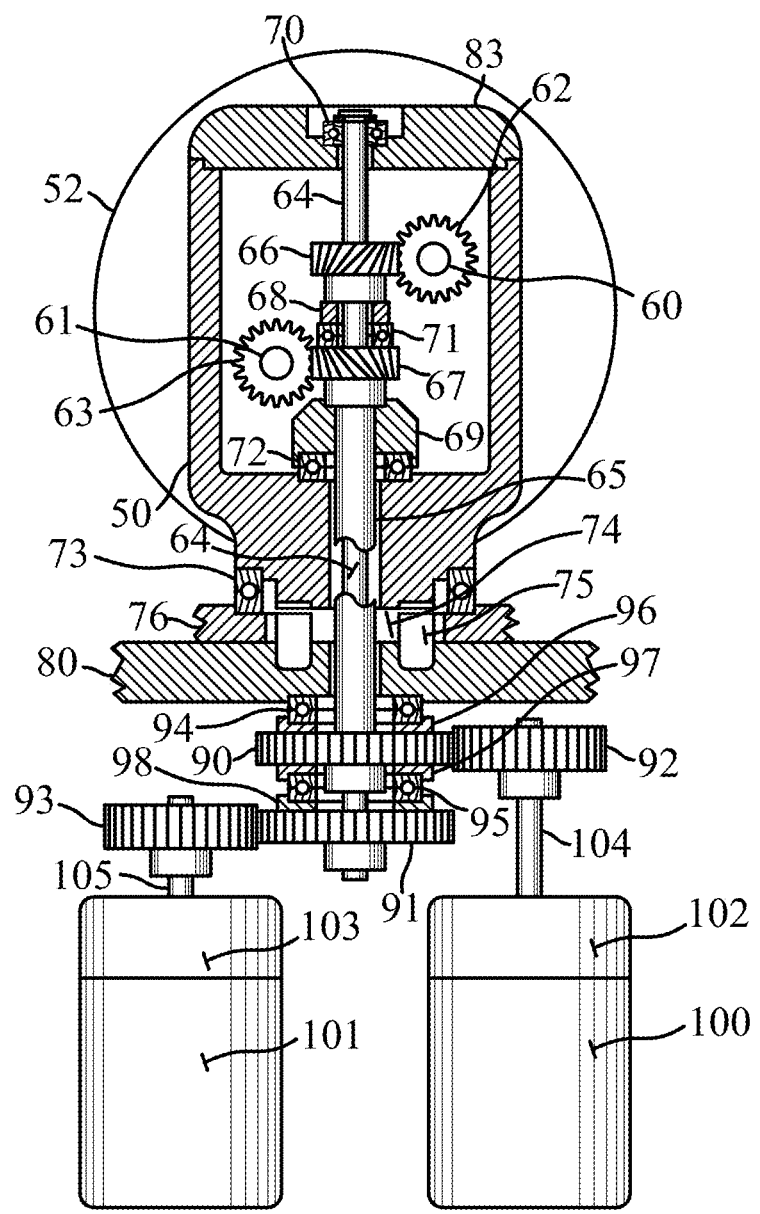
FIG. 3 is a cross-section view of another embodiment of the invention. This embodiment does not require the shaft driven by one motor to pass through the shaft of the other motor.

Mounting plate 76, only part of which is shown in the figures, rigidly attaches to and supports fixed frame 80. FIG. 3, which shows an embodiment different from that of FIG. 1, displays only part of fixed frame 80. For any embodiment, the fixed frame is the rigid mount for the bidirectional electric motors 100 and 101, and their associated gear boxes 102 and 103, respectively. The active electronics of angle encoder 75 is rigidly attached to fixed frame 80. That frame is closed by outside end cap 82 (not shown in FIG. 3). Flange 81 (not shown in FIG. 3) is for clamping fixed frame 80 to mounting plate 76.

Thrust bearing 73 and clearance gap 74 provide for mounting the pivoting frame 50 so it can rotate about the centerline of fixed frame 80. The pivoting frame is closed by inside end cap 83.

Drive wheels 52 and 53 are rigidly mounted on axles 42 and 43, respectively, which are supported by radial bearings. On the right side these are bearing 55 on rotating frame 50, and bearing 56 on right axle mount 41. Axle mounts 40 and 41 are rigidly attached to rotating frame 50. For purposes of illustration, right side axle mount 41 is shown broken away from rotating frame 50. Each wheel has a tire 54 for contacting the spherical surface 84.

There is a concentric pair of drive shafts: outer longitudinal shaft 65, and inner longitudinal shaft 64. The axis of this concentric pair coincides with the axis of rotation of pivoting frame 50, and these pass from the interior of fixed frame 80 into the interior of pivoting frame 50. Each of the motors rotates one of these drive shafts. The centerlines of axles 42 and 43 intersect the common centerline of longitudinal shafts 64 and 65, and the axis of rotation of pivoting frame 50.

On the right side (in FIG. 1), transfer shaft 61, which is parallel to axle 43, has two rigidly attached gears, helical gear 63 and spur gear 44. The latter meshes with spur gear 45 rigidly mounted on axle 43. There is a corresponding arrangement on the left side.

Consider the drive train for wheel 53. Helical gear 67 is rigidly affixed to the outer longitudinal shaft 65, and it meshes with helical gear 63. Transfer shaft 61 is rigidly affixed to both helical gear 63 and spur gear 44. The latter meshes with spur gear 45. Therefore, as outer longitudinal shaft 65 rotates, all of these elements, including axle 43 and wheel 53, rotate correspondingly.

Similarly, the drive train for wheel 52 has the inner longitudinal shaft 64 rigidly affixed to helical gear 66, which meshes with helical gear 62. Transfer shaft 60 is rigidly affixed to both helical gear 62 and a spur gear (not shown). The latter meshes with the spur gear (not shown) rigidly mounted on axle 42. Therefore, as inner longitudinal shaft 64 rotates, all of these elements, including wheel 52, rotate correspondingly.

A preferred arrangement is to have the gears arranged so that concentric shafts 64 and 65 rotate in the same direction when wheels 52 and 53 are also rotating in the same direction. This reduces frictional losses between the two concentric shafts during sphere rotation (but not, of course, when the wheel rotation is differential). It requires one pair of helical gears to be right-handed, the other pair to be left-handed.

FIGS. 1 and 3 show two different arrangements for the motors. In FIG. 1 the motors are aligned concentrically. The hollow shaft from gearbox 102 on motor 100 is extended to become the outer longitudinal shaft 65. The shaft from gearbox 103 on motor 101 passes through hollow shafts associated with motor 100 and gearbox 102, including outer longitudinal shaft 65, becoming inner longitudinal drive shaft 64.

The advantage of the arrangement in FIG. 1 is compactness: fixed frame 80 can be cylindrical. The disadvantage is that it requires special motors with hollow shafts.

In FIG. 3 a gear arrangement is used to couple the motors to the drive shafts. Shaft 104 from gearbox 102 on motor 100 is rigidly affixed to spur gear 92. The latter meshes with spur gear 90 which is rigidly affixed to outer longitudinal shaft 65. Similarly, shaft 105 from gearbox 103 on motor 101 is rigidly affixed to spur gear 93. The latter meshes with spur gear 91, which is rigidly affixed to inner longitudinal shaft 64. Thus, each motor drives the corresponding gear train and wheel.

The advantage of the arrangement in FIG. 3 is that it can be constructed using conventional motors. The main disadvantage is that it is not as compact as that of FIG. 1.

Several thrust bearings and spacers keep the longitudinal shafts in position. Thrust bearings 71 and 72 and associated spacers 68 and 69 inside of pivoting frame 50 prevent downward motion of the longitudinal shafts, and provide the force necessary to hold pivoting frame 50 against thrust bearing 73. Spacer 69 has seats for the hub of helical gear 67 and thrust bearing 72; these prevent lateral motion of the outer longitudinal shaft. Radial bearing 70 held in place by inside end cap 83 at the upper end of inner longitudinal shaft 64 maintains lateral alignment of the shaft at that end.

In FIG. 1, upward motion is prevented by thrust bearing 77 associated with the end of inner longitudinal shaft 64 protruding from the lower end of motor 101.

In FIG. 3, upward motion is limited by thrust bearings 94 and 95. Thrust bearing mounts 96 and 97 are rigidly affixed to spur gear 90, and thrust bearing mount 98 is rigidly affixed to spur gear 91. The combination of thrust bearing mounts and associated thrust bearings prevents lateral motion of the shafts, so proper meshing of the gears is maintained.

Also, it will be apparent to persons familiar with the appropriate art that the

It will be apparent to persons familiar with the appropriate art that there are other means of transferring motor shaft rotation to the longitudinal shafts; for example, extended gear trains, belt drives, and roller chains.

The invention claimed is:

1. A surface-moving mechanism comprising:
   a pair of wheels for frictionally moving a surface;
   a separate axle for each of the said wheels, each wheel rigidly mounted on its associated axle;
   a pivoting frame supporting the two axles, the axles being mounted for rotation within the pivoting frame, and with the centerline of each axle passing through the axis of rotation of the pivoting frame;
   for each axle a pivoting-frame-mounted drive shaft, hereinafter called "transfer shaft;"
   a concentric pair of drive shafts, hereinafter called "longitudinal shafts," with axis coinciding with the axis of rotation of the pivoting frame, each longitudinal drive shaft associated with one of the transfer shafts mounted on the pivoting frame;

for each axle, a transfer-shaft-rotation-transfer mechanism by which rotation of the transfer shaft associated with the axle effects corresponding rotation of the axle;

for each longitudinal shaft, a longitudinal-shaft-rotation-transfer mechanism by which rotation of the longitudinal shaft effects corresponding rotation of the transfer shaft;

a fixed frame;

a pair of motors mounted in the fixed frame, each motor associated with one of the longitudinal shafts;

a thrust bearing between the fixed frame and the pivoting frame, said thrust bearing providing for rotation of the pivoting frame relative to the fixed frame, with the longitudinal drive shafts passing through the center of the thrust bearing;

for each longitudinal shaft, a drive mechanism by which the longitudinal shaft is rotated by the motor associated with the longitudinal shaft; and an angle encoder mounted on the fixed frame, said angle encoder determining the angle of rotation of the pivoting frame relative to the fixed frame.

2. The transfer-shaft-rotation-transfer mechanism as in claim 1, by which rotation of a transfer shaft effects rotation of the corresponding axle, comprises a meshed pair of gears, one rigidly mounted on the transfer shaft, and the other rigidly mounted on the axle.

3. The longitudinal-shaft-rotation-transfer mechanism as in claim 1, by which rotation of a longitudinal shaft effects rotation of the corresponding transfer shaft, comprises a meshed pair of helical gears, one rigidly mounted on the longitudinal shaft, and the other rigidly mounted on the transfer shaft.

4. The longitudinal-shaft-rotation-transfer mechanism as in claim 1, by which rotation of a longitudinal shaft effects rotation of the corresponding transfer shaft, comprises a worm screw on the longitudinal shaft and a corresponding worm wheel on the associated transfer shaft.

5. The drive mechanism as in claim 1, by which each longitudinal shaft is rotated by the motor, is a direct connection between the longitudinal shaft and the associated motor.

6. The drive mechanism as in claim 1, by which each longitudinal shaft is rotated by the motor, comprises a meshed pair of gears, one rigidly mounted on the longitudinal shaft, and the other rigidly mounted on the shaft of the associated motor.

\* \* \* \* \*